(12) United States Patent
Hu et al.

(10) Patent No.: US 12,471,563 B1
(45) Date of Patent: Nov. 18, 2025

(54) WATER CONTROL AND SEAL STRUCTURE OF PET DRINKING PIPE

(71) Applicant: Taizhou Huangyan Pianpian Pet Products Factory (General Partnership), Zhejiang (CN)

(72) Inventors: Jian Hu, Zhejiang (CN); Bin Cai, Zhejiang (CN); Pianpian Cai, Zhejiang (CN)

(73) Assignee: Taizhou Huangyan Pianpian Pet Products Factory (General Partnership), Zhejiang (CN)

( * ) Notice: Subject to any disclaimer, the term of this patent is extended or adjusted under 35 U.S.C. 154(b) by 0 days.

(21) Appl. No.: 19/054,979

(22) Filed: Feb. 17, 2025

(30) Foreign Application Priority Data

Oct. 18, 2024 (CN) .......................... 202411458184.6
Oct. 18, 2024 (CN) .......................... 202422522897.6

(51) Int. Cl.
*A01K 1/035* (2006.01)
*A01K 39/02* (2006.01)

(52) U.S. Cl.
CPC ........ *A01K 1/0356* (2013.01); *A01K 39/0213* (2013.01)

(58) Field of Classification Search
CPC .................................................. A01K 39/0213
See application file for complete search history.

(56) References Cited

U.S. PATENT DOCUMENTS

| | | | | |
|---|---|---|---|---|
| 2,475,739 A * | 7/1949 | Gustav | ..................... | F04B 53/12 |
| | | | | 119/72.5 |
| 3,669,077 A * | 6/1972 | Spierenburg | ....... | A01K 39/0213 |
| | | | | 137/630.22 |
| 3,838,664 A * | 10/1974 | Atchley | ............. | A01K 39/0213 |
| | | | | 119/72.5 |
| 6,237,800 B1 * | 5/2001 | Barrett | ...................... | A45F 3/16 |
| | | | | 215/312 |
| 6,553,937 B1 * | 4/2003 | Cheng | ...................... | A01K 7/06 |
| | | | | 119/72.5 |
| 6,588,368 B1 * | 7/2003 | Cheng | ...................... | A01K 7/06 |
| | | | | 119/72 |
| 6,810,830 B1 * | 11/2004 | Cheng | ...................... | A01K 7/06 |
| | | | | 119/72.5 |
| 8,127,716 B2 * | 3/2012 | Orozco Osorio | .. | A01K 39/0213 |
| | | | | 119/72.5 |
| 11,154,035 B2 * | 10/2021 | Cai | .......................... | A01K 7/06 |
| 2007/0245969 A1 * | 10/2007 | Johnson | ............. | A01K 39/0213 |
| | | | | 119/72.5 |
| 2014/0239215 A1 * | 8/2014 | Cardaropoli | ............. | A01K 7/06 |
| | | | | 251/319 |
| 2020/0053981 A1 * | 2/2020 | Cai | .......................... | B23B 5/06 |

FOREIGN PATENT DOCUMENTS

CN             206437393 U      8/2017

* cited by examiner

*Primary Examiner* — Monica L Perry
*Assistant Examiner* — Brittany A Lowery
(74) *Attorney, Agent, or Firm* — Cooper Legal Group, LLC

(57) ABSTRACT

A water control and seal structure of a pet drinking pipe including a drinking pipe body, wherein a water outlet head is provided on the drinking pipe body, a water outlet is defined in the water outlet head, a water outlet steel ball is provided in the water outlet, and the water control and seal structure is provided between the water outlet head and the drinking pipe body.

10 Claims, 5 Drawing Sheets

WATER CONTROL AND SEAL STRUCTURE OF PET DRINKING PIPE

CROSS-REFERENCE TO RELATED APPLICATION

The present application is based on and claims the priority benefits of China application No. 202411458184.6, filed on Oct. 18, 2024, and China application No. 202422522897.6, filed on Oct. 18, 2024. The entireties of China application No. 202411458184.6 and China application No. 202422522897.6 are hereby incorporated by reference herein and made a part of this specification.

TECHNICAL FIELD

The present application belongs to a field of pet supplies, and relates to a pet drinking pipe, in particular to a water control and seal structure of a pet drinking pipe.

BACKGROUND ART

A pet drinking pipe is a pipe for discharging water from a pet drinking bowl. Patent CN 206437393 U discloses a bottle cap of a reinforced pet drinking bowl, wherein a seal ring is provided in an orifice of a water outlet pipe, a steel ball is provided in the water outlet pipe, and the steel ball is matched with the seal ring. When drinking water, a pet licks the steel ball with its tongue, the steel ball is separated from the seal ring for sealing the orifice, water flows out from the water outlet pipe, and thus, the pet gets drinking water. However, on one hand, when hamsters and other rodents are fed, the rodents have a habit of grinding teeth. During a process of drinking water, the rodents will tear and bite the seal ring using their teeth, which will easily fracture the seal ring to lead to water leakage from the water outlet pipe. On the other hand, rabbits and other small animals have a habit of playing water and like to push out the water outlet steel ball using their mouths or noses. Traditional drinking pipes do not have a water control structure, which results in great loss and waste of water and wets a pet cage and a ground to cause environmental pollution, and thus, the drinking bowl does not play a corresponding role.

SUMMARY

An object of the present application is to provide a water control and seal structure of a pet drinking pipe, which not only can control a water flow, but also can seal a water outlet pipe without a seal ring and overcoming tearing and biting, so as to overcome defects in the prior art.

In order to achieve the above-mentioned object, the present application adopts the following technical solutions.

A water control and seal structure of a pet drinking pipe including a drinking pipe body, wherein a water outlet head is provided on the drinking pipe body, a water outlet is defined in the water outlet head, a water outlet steel ball is provided in the water outlet, and the water control and seal structure is provided between the water outlet head and the drinking pipe body.

In some embodiments, the water control and seal structure includes a water control joint, a first end of the water control joint is connected to the drinking pipe body, a second end of the water control joint is connected to the water outlet head, a water control sleeve is provided in the water control joint, a water control backing ring is provided in the water control sleeve, a water control steel ball is provided on the water control backing ring, and a limiting structure is further provided on the water control joint and is correspondingly matched with the water outlet steel ball.

In some embodiments, the limiting structure includes an internal necking defined on the water control joint, and a diameter $\Phi 1$ of the internal necking is smaller than a diameter $\Phi 2$ of the water outlet steel ball.

In some embodiments, the water control joint is connected to the drinking pipe body and the water outlet head through screw threads.

In some embodiments, a first seal element is provided between the water control joint and the drinking pipe body, and a second seal element is provided between the water control joint and the water outlet head.

In some embodiments, the first seal element and the second seal element are a seal ring or a seal strip.

In some embodiments, a gravity steel ball is provided in the drinking pipe body, a number of the gravity steel ball is 1-3, and a first gravity steel ball is in contact with the water control steel ball.

In some embodiments, the water control joint is made of a metal material, the water control sleeve is made of a rubber material, an embedded groove is defined in the water control joint, and the water control sleeve is embedded into the embedded groove.

In some embodiments, the drinking pipe body is a straight pipe or a bent pipe.

In some embodiments, an external diameter $\Phi 3$ of the drinking pipe body is 6-25 mm and is optimally 10 mm, 12.7 mm or 16 mm.

By providing the water control and seal structure between the water outlet head and the drinking pipe body, the water control and seal structure of the pet drinking pipe in the present application achieves control of an outflow water and is applicable to pets with different sizes and body shapes so as to be wide in application range. Particularly, the water control and seal structure includes the water control sleeve provided in the water control joint, the water control backing ring is provided in the water control sleeve, the water control steel ball is in seal contact with the water control backing ring through a gravity itself, and therefore, it is unnecessary to additionally provide a seal ring, which not only achieves a good sealing effect, but also overcomes tearing and biting of pet and avoids water leakage accidents. At the same time, by providing the limiting structure, even if a pet touches the water outlet steel ball by mistake, water cannot flow out with a high flow or flow up, which is beneficial for a pet owner to reasonably use a drinking bowl.

DETAILED DESCRIPTION

The present application will be described below in detail referring to specific embodiments. The following embodiments will be beneficial for those skilled in the art to further understand the present application, but will not be intended to limit the present application in any form.

Figure 1:
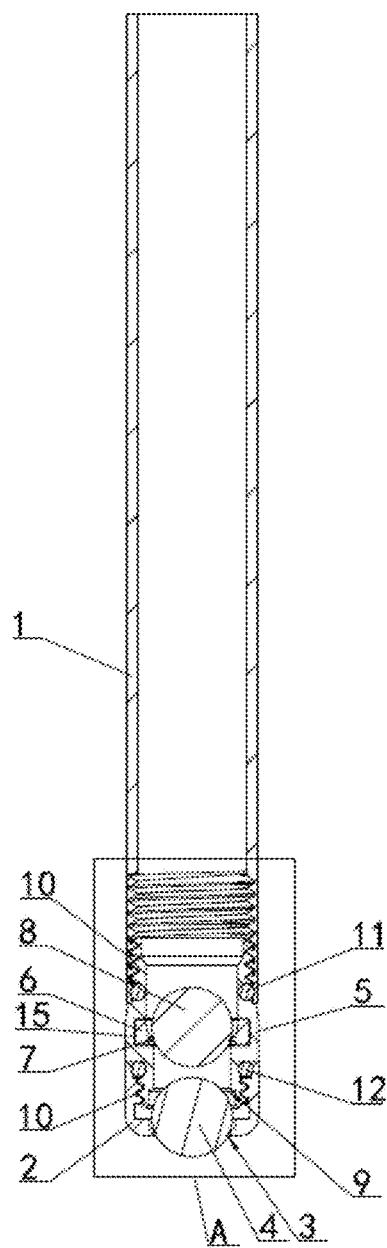
FIG. 1 is a sectional view of a water control and seal structure of a pet drinking pipe in the present application.
Figure 2:
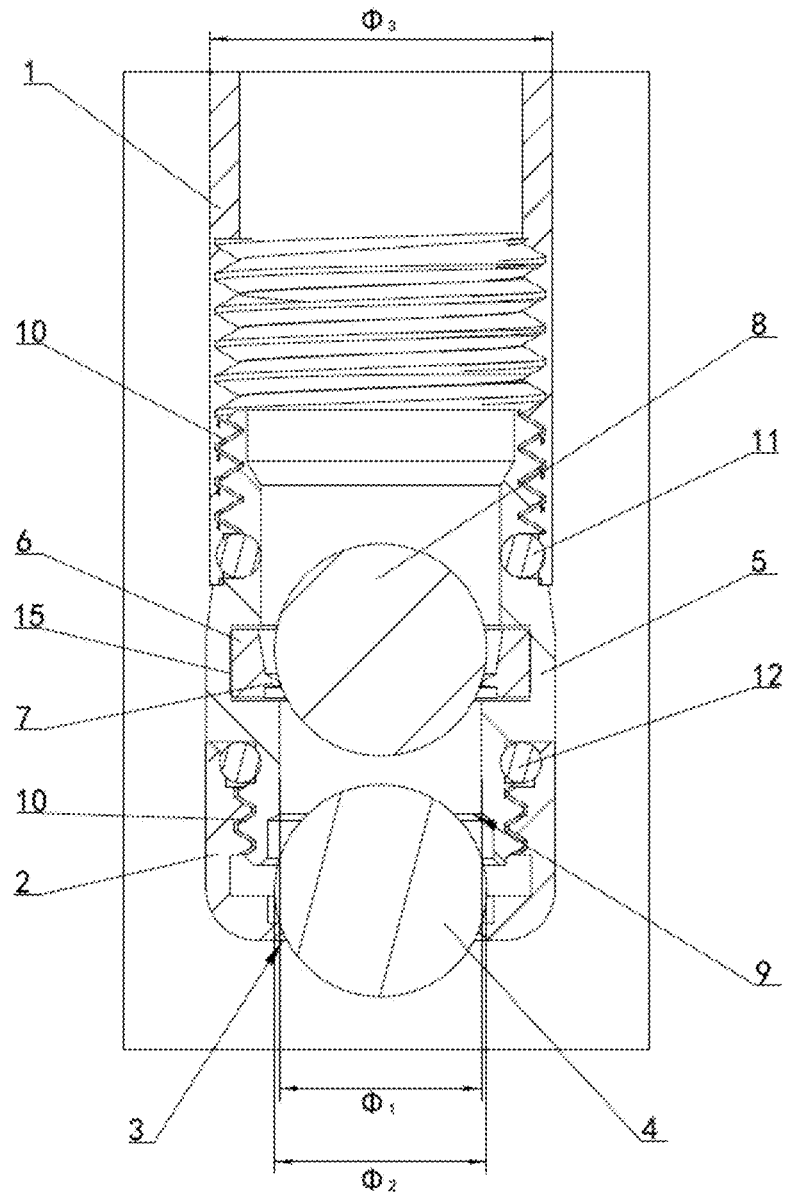
FIG. 2 is a partial enlarged view of part A in FIG. 1.
Figure 3:
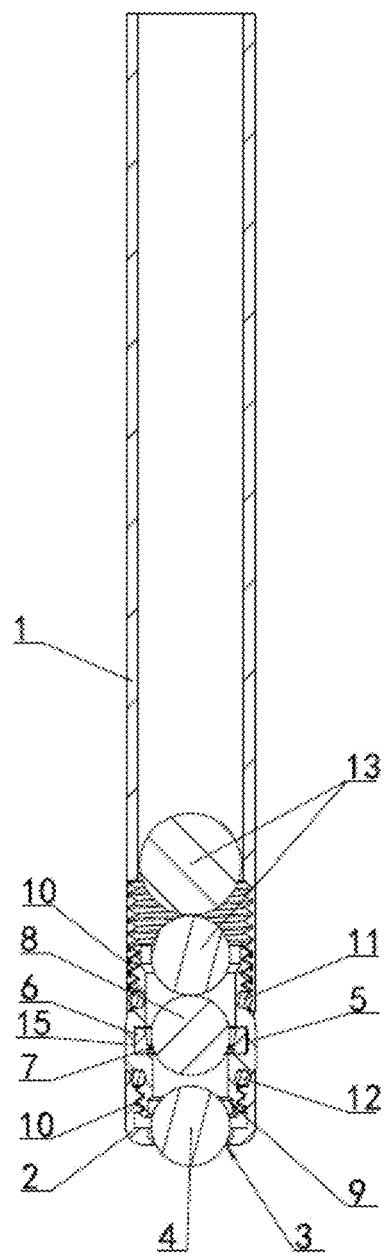
FIG. 3 is a schematic view of a water control and seal structure with two gravity steel balls in the present application.
Figure 4:
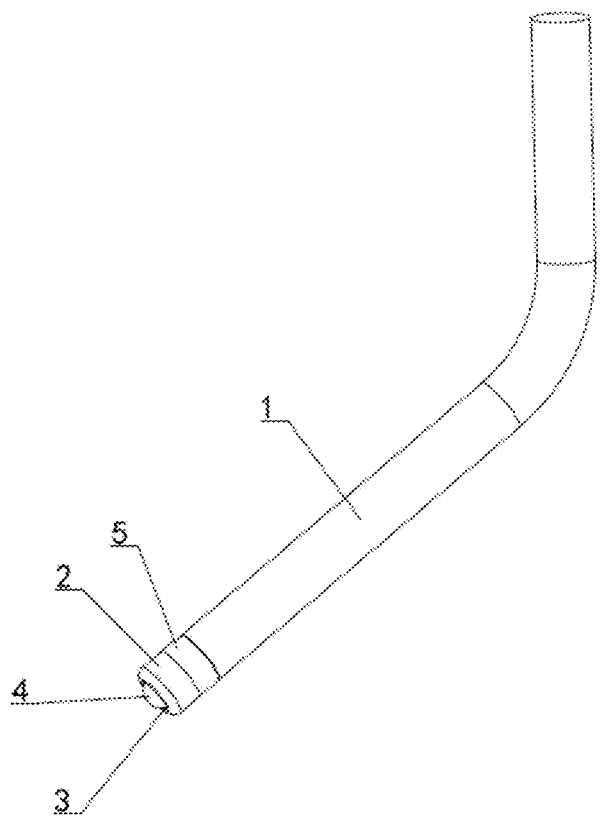
FIG. 4 is a schematic view of a drinking pipe body being a bent pipe in the present application.
Figure 5:
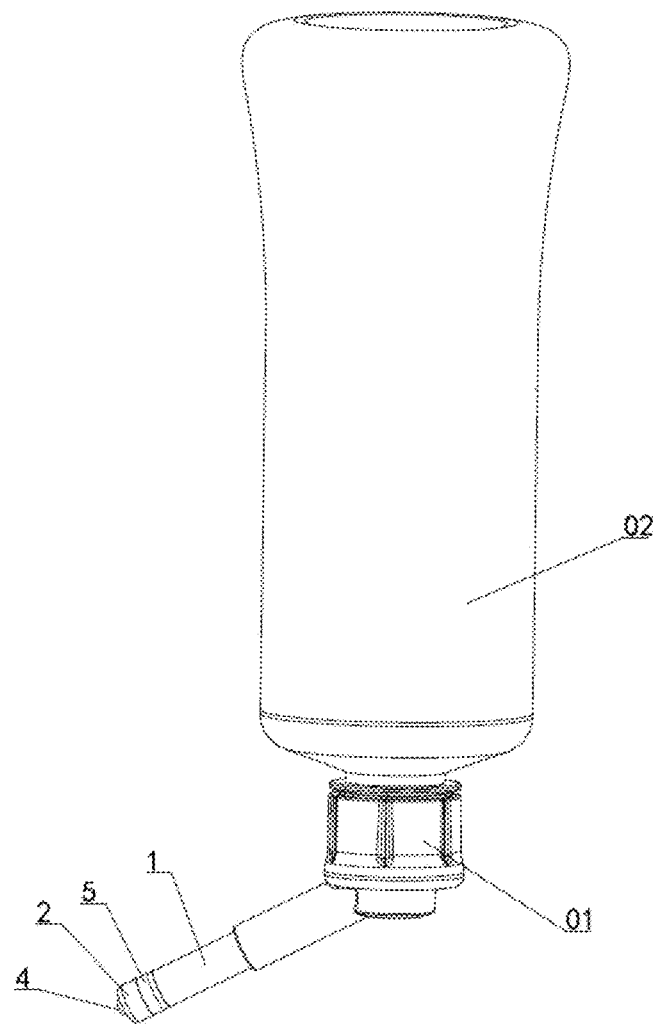
FIG. 5 is a schematic view of a pet drinking pipe in an applied state in the present application.

As shown in FIG. 1 to FIG. 5, the present application relates to a water control and seal structure of a pet drinking pipe, including a drinking pipe body 1, wherein a water outlet head 2 is provided on the drinking pipe body 1, a water outlet 3 is defined in the water outlet head 2, and a water outlet steel ball 4 is provided in the water outlet. The water control and seal structure is provided between the water outlet head 2 and the drinking pipe body 1. In an actual product, an upper end of the drinking pipe body 1 is connected to a bottleneck connecting seat 01, and the bottleneck connecting seat 01 is connected to a bottleneck of a drinking bottle 02. During use, a pet licks the water outlet steel ball 4 with its tongue, after stressed, the water outlet steel ball upwards moves away from the water outlet 3 and is in contact with the water control and seal structure to open the water control and seal structure, so that water in the drinking bottle 02 flows out from the water outlet 3 through the water control and seal structure, and then, the pet can drink water. In the present solution, by providing the water control and seal structure between the water outlet head 2 and the drinking pipe body 1, the water control and seal structure achieves control of the outflow water and is applicable to pets with different sizes and body shapes so as to be wide in application range. The water control and seal structure not only can control a water flow, but also has a self-seal structure, and therefore, it is unnecessary to additionally provide a seal ring, which not only achieves a good sealing effect, but also overcomes tearing and biting of pet and avoids water leakage accidents. At the same time, even if a pet touches the water outlet steel ball by mistake, water cannot flow out with a high flow or flow up, which is beneficial for a pet owner to reasonably use a drinking bowl.

Embodiment 1: the water control and seal structure includes a water control joint 5, a first end of the water control joint 5 is connected to the drinking pipe body 1, a second end of the water control joint 5 is connected to the water outlet head 2, a water control sleeve 6 is provided in the water control joint 5, a water control backing ring 7 is provided in the water control sleeve, and a water control steel ball 8 is provided on the water control backing ring 7. A limiting structure is further provided on the water control joint 5 and is correspondingly matched with the water outlet steel ball 4. In an actual product, a shape of the water control backing ring is designed according to a circular arc surface of the water control steel ball, so that the water control steel ball is fitted to the water control backing ring when being on the water control backing ring, forming a surface contact seal with good sealing effect. When a pet drinks water, the water outlet steel ball 4 is stressed to move upwards so as to be in contact with the water control steel ball 8 and remove the water control steel ball 8 from the water control backing ring 7, and then, water in the drinking bottle 02 flows out from the water control joint 5 and then flows into a mouth of the pet through the water outlet 3. At the same time, a position of the water outlet steel ball 4 moves upwards can be limited by the limiting structure, thereby limiting the position of the water control steel ball moves upwards, and realizing an control of the water flow.

Further, the limiting structure includes an internal necking 9 defined on the water control joint 5, and a diameter $\Phi 1$ of the internal necking 9 is smaller than a diameter $\Phi 2$ of the water outlet steel ball 4. The diameter of the internal necking is smaller than the diameter of the water outlet steel ball, the water outlet steel ball cannot completely enter the water control joint, thereby achieving a limit.

Further, the water control joint 5 is connected to the drinking pipe body 1 and the water outlet head 2 through screw threads 10. Threaded connection is convenient and reliable.

Further, a first seal element 11 is provided between the water control joint 5 and the drinking pipe body 1, a second seal element 12 is provided between the water control joint 5 and the water outlet head 2, and improving the sealing effect through the first seal element and the second seal element.

Further, the first seal element 11 and the second seal element 12 are a seal ring or a seal strip, the seal ring can be provided between the water control joint and the drinking pipe body and between the water control joint and the water outlet head, the seal strip can be wound on the screw thread, both of which are very good in sealing effect.

Further, a gravity steel ball 13 is provided in the drinking pipe body 1, a number of the gravity steel ball is 1-3, and a first gravity steel ball is in contact with the water control steel ball 8. There is water in the drinking pipe body, the water control steel ball is easy to float under an action of a buoyance of water, and therefore, the gravity steel balls are provided on the water control steel ball. Thus, when not used, the water control steel ball is pressed, so that the water control steel ball is in seal contact with the water control backing ring; and during drinking, the water control steel ball is more easily jacked, so that water flows out.

Further, the water control joint 5 is made of a metal material, and the water control sleeve 6 is made of a rubber material. An embedded groove 15 is defined in the water control joint 5, and the water control sleeve 6 is embedded into the embedded groove 15. The water control joint is generally made of steel, thereby having high strength; and the water control sleeve is generally made of the rubber material (such as silica gel), thereby having good elasticity.

Further, the drinking pipe body 1 is a straight pipe or a bent pipe, which can be adapted to different types of drinking bowls.

Further, an external diameter $\Phi 3$ of the drinking pipe body 1 is 6-25 mm and is optimally 10 mm, 12.7 mm or 16 mm. The external diameter of the drinking pipe body can be set according to a water intake of a pet, and a drinking pipe body with a larger external diameter has a higher water flow. However, generally, drinking requirements of most of pets can be met by adopting the drinking pipe of which the external diameter is 10 mm, 12.7 mm or 16 mm.

The above-mentioned specific embodiments are intended to explain the present application, rather than to limit the present application. Any modification and changes made on the present application within a spirit of the present application and a protective scope of claims fall within the protective scope of the present application.

What is claimed is:

1. A water control and seal structure of a pet drinking pipe, comprising a drinking pipe body, wherein a water outlet head is provided on the drinking pipe body, a water outlet is defined in the water outlet head, a water outlet steel ball is provided in the water outlet, and the water control and seal structure is provided between the water outlet head and the drinking pipe body;

wherein the water control and seal structure comprises a water control joint, a first end of the water control joint is connected to the drinking pipe body, a second end of the water control joint is connected to the water outlet head, a water control sleeve is provided in the water control joint, a water control backing ring is provided in the water control sleeve, a water control steel ball is provided on the water control backing ring, and a limiting structure is further provided on the water control joint and is correspondingly matched with the water outlet steel ball.

2. The water control and seal structure of the pet drinking pipe according to claim 1, wherein the limiting structure comprises an internal necking defined on the water control joint, and a diameter ($\Phi1$) of the internal necking is smaller than a diameter ($\Phi2$) of the water outlet steel ball.

3. The water control and seal structure of the pet drinking pipe according to claim 1, wherein the water control joint is connected to the drinking pipe body and the water outlet head through screw threads.

4. The water control and seal structure of the pet drinking pipe according to claim 1, wherein a first seal element is provided between the water control joint and the drinking pipe body, and a second seal element is provided between the water control joint and the water outlet head.

5. The water control and seal structure of the pet drinking pipe according to claim 4, wherein each of the first seal element and the second seal element is a seal ring or a seal strip.

6. The water control and seal structure of the pet drinking pipe according to claim 1, wherein one to three gravity steel balls are provided in the drinking pipe body, and a first gravity steel ball of the one to three gravity steel balls is in contact with the water control steel ball.

7. The water control and seal structure of the pet drinking pipe according to claim 1, wherein the water control joint is made of a metal material, the water control sleeve is made of a rubber material, an embedded groove is defined in the water control joint, and the water control sleeve is embedded into the embedded groove.

8. The water control and seal structure of the pet drinking pipe according to claim 1, wherein the drinking pipe body is a straight pipe or a bent pipe.

9. The water control and seal structure of the pet drinking pipe according to claim 1, wherein an external diameter ($\Phi3$) of the drinking pipe body is 6-25 mm.

10. The water control and seal structure of the pet drinking pipe according to claim 9, wherein the external diameter ($\Phi3$) of the drinking pipe body is 10 mm, 12.7 mm or 16 mm.

\* \* \* \* \*